United States Patent Office 3,810,852
Patented May 14, 1974

---

3,810,852
THIXOTROPIC AQUEOUS DISPERSIONS OF POLYMERS AND COPOLYMERS DERIVED FROM ETHYLENICALLY UNSATURATED MONOMERS
Ian McAlpine, Manchester, and David John Clough, Bolton, England, assignors to Magnesium Elektron Limited, Manchester, England
No Drawing. Continuation of abandoned application Ser. No. 112,036, Feb. 2, 1971. This application Mar. 29, 1973, Ser. No. 345,839
Claims priority, application Great Britain, Feb. 2, 1970, 4,887/70
Int. Cl. C09d 3/74, 5/04
U.S. Cl. 260—17 R                    9 Claims

ABSTRACT OF THE DISCLOSURE

This invention is concerned with thixotropic, aqueous dispersions of polymers and copolymers, such dispersions find many applications in industry and the present invention is particularly, but not exclusively, directed to the application of the dispersions in the manufacture of paint, for example, emulsion paint. The dispersions of the invention contain a zirconium carbonate complex which imparts to the dispersive properties not obtainable with previously used zirconium derivations.

---

This is a continuation of application Ser. No. 112,036, filed Feb. 2, 1971, now abandoned.

BACKGROUND OF THE INVENTION

The present invention relates to thixotropic aqueous dispersions of polymers and copolymers.

The invention is more particularly, but not exclusively, concerned, with aqueous surface coating compositions such as are generally referred to as emulsion paints.

The advantages of aqueous surface coating compositions exhibiting thixotropy over those exhibiting normal rheological properties are well known. Some aqueous polymer or copolymer dispersions exhibit a degree of thixotropy but the degree is insufficient for most practical purposes and it is therefore necessary to introduce into the dispersion an agent capable of imparting thixotropy.

A number of suitable agents based on zirconium have already been proposed. These include zirconium/organic acid chelates and zirconium chelates prepared by reacting zirconium alkoxides with alkanolamines.

It has been found, however, that the zirconium/organic acid chelates do not always provide the degree of thixotropy desired when comparatively large quantities of polyphosphates are present in aqueous polymer dispersions as may be the case in emulsion paints. Polyphosphates are nevertheless excellent dispersing agents which are frequently used in the manufacture of emulsion paints to enable large quantities of solids, e.g. pigments and extenders, to be held in suspension in the aqueous polymer dispersion. In many instances pigments are supplied by manufacturers in admixture with polyphosphates.

SUMMARY

According to the broadest aspect of the invention there is provided an aqueous dispersion of a polymer or copolymer containing a zirconium carbonate complex prepared by the mixing of a zirconium oxide compound and a water soluble carbonate.

Preferably the zirconium oxide compound is a zirconium oxide halide, nitrate or acetate.

Advantageously, the aqueous dispersion of the polymer or copolymer contains a stabilizing colloid.

A suitable stabilizing colloid may be selected from cellulose derivatives containing a hydroxy group such as sodium carboxy methyl cellulose, methyl cellulose, hydroxyethyl cellulose, hydroxypropyl methyl cellulose and polyvinyl alcohol.

The colloid may be selected from the stabilizing colloids previously mentioned.

According to a narrower aspect of the invention there is provided an emulsion paint comprising an aqueous dispersion of a polymer or copolymer, a colloid, a pigment and a zirconium carbonate complex prepared by the mixing of a zirconium oxide compound and a water soluble carbonate.

Preferably the zirconium carbonate complex is present in an amount such as to provide 0.01–5% zirconium by weight in the paint.

The water soluble carbonate may be a carbonate of an alkali metal, ammonia or an organic base, for example guanidine.

The polymer or copolymer in the aqueous dispersion may be derived from ethylenically unsaturated monomers and include, for example, the polymers and copolymers of vinyl esters such as vinyl acetate; acrylic and methacrylic esters such as 2-ethylhexyl acrylate; styrene, acrylonitrile and butadiene.

The pigment may be any one or more of the pigments normally used in the paint manufacturing industry. The emulsion paint may also include extenders such as clay, chalk or talc and dispersants or surface active agents such as polyphosphates for example sodium hexametaphosphate, these extenders and dispersants often being incorporated in admixture with the pigment as supplied to the paint manufacturer. The emulsion paint may further include small amounts of fungicides, bactericides, foam suppressants and corrosion inhibitors.

Solutions of double carbonates of zirconium prepared by the dissolution of zirconium basic carbonate in a solution of an alkali metal or ammonium carbonate are well known. For example, commercial ammonium zirconyl carbonate is prepared by dissolving 1 mole of zirconium basic carbonate in 3 moles of ammonium carbonate or 3 moles of ammonium bicarbonate/aqueous ammonia solution. However, these double carbonates do not produce thixotropy in aqueous dispersions of polymers and copolymers even in the complete absence of polyphosphates.

The essence of the presnt invention resides in the discovery that zirconium carbonate complexes prepared by the method described by L. A. Pospelova and L. M. Zaitsev (Russian Journal of Inorganic Chemistry 11,995, 1966) produce an excellent thixotropic effect in aqueous dispersions of polymers and copolymers. This preparative method basically comprises mixing zirconium oxide chloride with a water soluble carbonate, for example, a carbonate of an alkali metal, ammonia or an organic base such as guanidine.

To prepare, for example, potassium zirconium carbonate a concentrated aqueous solution of zirconium oxide chloride is added to a 15% by weight solution of potassium carbonate while vigorously stirring the mixture until a slight permanent precipitate is obtained. The precipitate is filtered off and methanol is added to filtrate to precipitate the carbonate complex. The precipitated carbonate complex is filtered off, washed with a 1:1 mixture of water and methanol to remove potassium chloride then with methanol and finally with diethylether. The white powder obtained is freed from mechanically held water to avoid hydrolysis during storage. The formula proposed for the complex obtained is

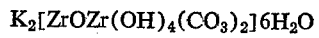

in which the ratio of $Zr:CO_3$ is 1:1.

To prepare, for example, sodium zirconium carbonate a concentrated aqueous solution of zirconium oxide chloride is added to a hot concentrated sodium carbonate solution while vigorously stirring the mixture. The resulting precipitate of the sodium carbonate complex is filtered off and washed successively with a mixture of methanol and water, methanol and finally with diethylether until free from mechanically held water. The formula proposed for the complex is $Na_4[ZrOZr(OH)_2(CO_3)_4]8H_2O$ in which the ratio of Zr:$CO_3$ is 1:2.

To illustrate the thixotropic properties of the zirconium carbonate complexes produced by the addition of zirconium oxide chloride to a water soluble carbonate the following examples of emulsion paints incorporating the carbonate complexes are given.

EXAMPLE 1

120 parts rutile titanium dioxide, 60 parts china clay and 60 parts of a 1.5% by weight aqueous solution of hydroxy ethyl cellulose were thoroughly dispersed in 100 parts of water containing 1 part of sodium hexametaphosphate. This dispersion was thoroughly mixed with 160 parts of a dispersion of a vinyl acetate co-polymer and the pH of the mixture adjusted to 8.5 by the addition of about 7 parts of diluted aqueous ammonia (1 part 0.880 $NH_3$:1 part water). Finally, 3 parts of dipotassium tetrahydroxydicarbonatedizirconate hexahydrate $K_2[ZrOZr(OH)_4(CO_3)_2]6H_2O$, dissolved in 30 parts of water was incorporated in the mixture and within a few hours the resulting paint had set to a firm gel.

The gel strength of the resulting paint was measured by means of Imperial Chemical Industries Strength Tester, manufactured by Sheen Instruments Limited, Richmond, England. The initial gel strength, that is the gel strength measured 24 hours after the preparation of the paint, was found to be 283 g./cm. and the regain gel strength, that is the gel strength measured 24 hours after shearing the paint and allowing to re-gel, was found to be 220 g./cm.

Substitution of the zirconium carbonate complex by 10 parts of a zirconium/organic acid chelate solution, giving substantially the same zirconium content, caused the paint rapidly to set to a firm gel.

EXAMPLE 2

120 parts of rutile titanium dioxide, 60 parts of china clay and 60 parts of a 1.5% by weight aqueous solution of hydroxy ethyl cellulose were thoroughly dispersed in 100 parts of water containing 3 parts of sodium hexametaphosphate. This dispersion was mixed with 160 parts of a dispersion of a vinyl acetate copolymer and the pH of the mixture adjusted to 8.5 by additions of about 7 parts of diluted aqueous ammonia. Finally, 3 parts of dipotassium tetrahydroxydicarbonatodizirconate hexahydrate, $K_2[ZrOZr(OH)_4(CO_3)_2]6H_2O$, dissolved in 30 parts of water were incorporated in the mixture and within a few hours the resulting paint set to a firm gel.

Substitution of the zirconium carbonate complex by 10 parts of a zirconium/organic acid chelate solution, giving substantially the same zirconium content produced no gelling of the paint; addition of several times this quantity of the chelate also failed to bring about gelation of the paint.

EXAMPLE 3

120 parts of rutile titanium dioxide, 60 parts of china clay and 60 parts of a 1.5% by weight aqueous solution of hydroxyethyl cellulose were thoroughly dispersed in 100 parts of water containing 1.5 parts of sodium hexametaphosphate. This dispersion was mixed with 160 parts of a dispersion of a vinyl acetate copolymer and the pH of the mixture adjusted to 8.5 by the addition of 5 parts of diluted aqueous ammonia. 43 parts of Irgalite Yellow CPV2A and 2.2 parts of Irgalite Red CPV3, both pigments manufactured by Geigy Limited., and 2 parts of $K_2[ZrOZr(OH)_4(CO_3)_2]\cdot 6H_2O$, dissolved in 30 parts of water were incorporated in the mixture. The resulting orange coloured emulsion paint set to a firm smooth gel within a few hours.

The gel strength of the paint of this example, measured as described in Example 1, was found to be G./cm.
Initial gel strength _____ 250
Regain gel strength _____ 235

The addition of zirconium/organic acid chelate solution, giving substantially the same zirconium content, did not cause gelate of this colored paint.

It will be seen from a comparison of Example 1 with Examples 2 and 3 that paints produced in accordance with the invention gelled despite containing such a quantity of added polyphosphate that the known zirconium/organic acid chelates were rendered ineffective.

The zirconium carbonate complexes of the present invention cause initial gellation of aqueous polymer or copolymer dispersions at a slower rate than the chelates used previously. This property is of advantage when a large number of small quantities of a dispersion are required, for example, tins or cans of paint. The dispersion can be prepared in a single large quantity and then be divided, by pouring, into the required number of smaller quantities while still liquid, that is before gellation is complete.

Although the preparation of zirconium carbonate complexes has been described using zirconium oxide chloride it will be appreciated that zirconium oxide fluoride, bromide or iodide or zirconium oxide nitrate or acetate may be used in the preparation of the complexes in place of the chloride.

We claim:

1. A thixotropic aqueous dispersion consisting essentially of
   (1) a water dispersible polymer derived from at least one ethylenically unsaturated monomer,
   (2) a stabilizing colloid selected from the group consisting of sodium carboxy methyl cellulose, methyl cellulose, hydroxymethyl cellulose, hydroxypropyl methyl cellulose and polyvinyl alcohol, and
   (3) a water soluble zirconyl carbonate complex preformed from (i) a water soluble zirconyl compound selected from the group consisting of zirconium oxide halides, zirconium oxide nitrate and zirconium oxide acetate and (ii) a water soluble carbonate selected from the group consisting of alkali metal carbonates, ammonium carbonate and carbonates of organic bases.

2. A thixotropic aqueous dispersion according to claim 1, in which the ethylenically unsaturated monomer from which the water dispersible polymer is derived is selected from the group consisting of vinyl esters, acrylic and methacrylic esters, styrene, acrylonitrile and butadiene.

3. A thixotropic aqueous dispersion according to claim 1 wherein said water soluble zirconium carbonate complex has a $CO_3$:Zr ratio no greater than 2.

4. An emulsion paint having thixotropic properties consisting essentially of
   a water dispersible polymer derived from at least one ethylenically unsaturated monomer,
   sufficient of a stabilizing colloid to stabilize the polymer dispersion,
   a paint pigment,
   a polyphosphate detergent and
   an amount such as to provide from 0.1 to 5% zirconium by weight in the paint of a water soluble zirconium carbonate complex which is the reaction product of (1) a water soluble zirconium oxide compound selected from the group consisting of zirconium oxide halides, zirconium oxide nitrate and zirconium oxide acetate and (2) a water soluble carbonate.

5. An emulsion paint according to claim 4, in which the stabilizing colloid is selected from the group consisting of sodium carboxy methyl cellulose, methyl cellulose, hydroxymethyl cellulose, hydroxypropyl methyl cellulose and polyvinyl alcohol.

6. An emulsion paint according to claim 4, in which the water soluble carbonate is selected from the group consisting of alkali metal carbonates, ammonium carbonates and carbonates of organic bases.

7. An emulsion paint according to claim 4, in which the ethylenically unsaturated monomer from which the water dispersible polymer is derived is selected from the group consisting of vinyl esters, acrylic and methacrylic esters, styrene, acrylonitrile and butadiene.

8. An emulsion paint according to claim 4, in which the paint includes at least one ingredient selected from the group consisting of conventional paint extenders, surface active agents and dispersants.

9. An emulsion paint according to claim 4 wherein said water soluble zirconium carbonate complex has a $$CO_3:Zr$$

ratio no greater than 2.

References Cited
UNITED STATES PATENTS

| | | | |
|---|---|---|---|
| 2,758,102 | 8/1956 | Grummitt et al. | 260—29.6 MM |
| 3,280,050 | 10/1966 | Johnson | 260—17 R |

LUCILLE M. PHYNES, Primary Examiner

U.S. Cl. X.R.

260—29.6 MM, 29.6 MP, 29.7 M